Aug. 29, 1950
C. L. KITE
2,520,247
FLAT TIRE DETECTOR SWITCH
Filed Feb. 28, 1947
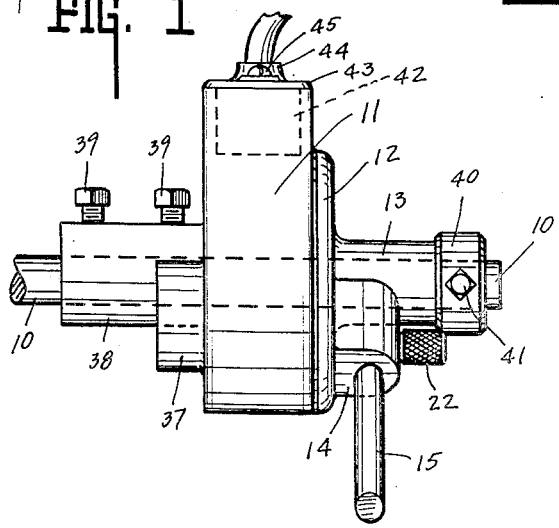
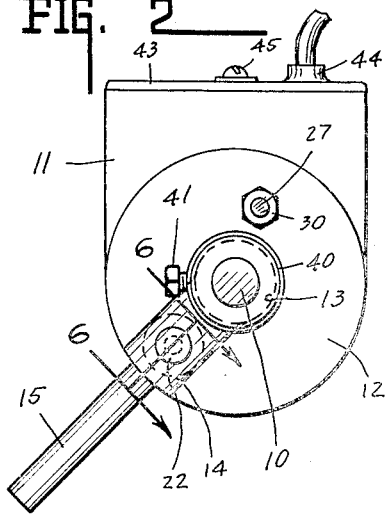
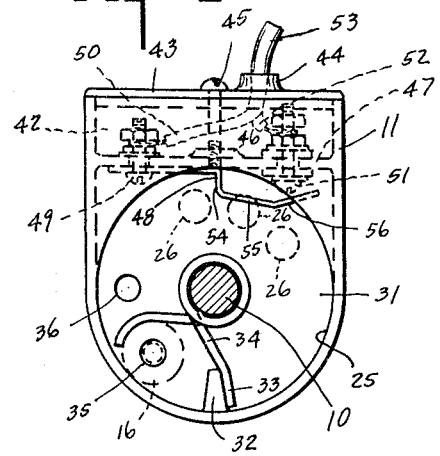
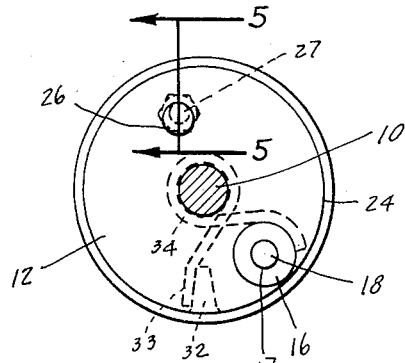
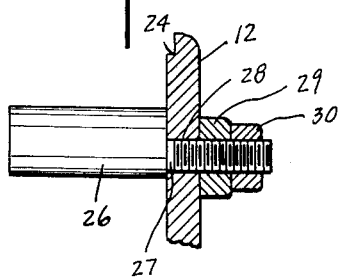
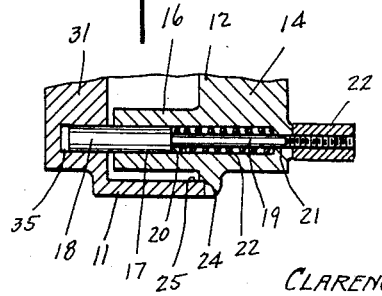
INVENTOR.
CLARENCE L. KITE.
BY
Lockwood, Goldsmith & Galt,
ATTORNEYS.

Patented Aug. 29, 1950

2,520,247

UNITED STATES PATENT OFFICE 2,520,247

FLAT TIRE DETECTOR SWITCH

Clarence L. Kite, Radnor, Ind., assignor of two-thirds to Pauline E. Kite and one-third to Ira Benson, both of Logansport, Ind.

Application February 28, 1947, Serial No. 731,654

9 Claims. (Cl. 200—58)

This invention relates to a flat or unduly deflated tire detector and more particularly to one capable of use with dual tires.

This invention, in common with that disclosed in Kite Patent No. 2,213,782 dated September 3, 1940, when applied to dual tires, includes an active element disposed between the tires in such a manner that in normal wheel rotation, that is, forward, when either tire is flat or sufficiently deflated so as to cause injury to the tire, the active element is laterally engaged and tilted for effecting signal indication.

The chief object of the present invention is to improve the control unit and switch of a structure such as illustrated and claimed in the aforesaid patent.

The chief feature of the present invention resides in the control unit and switch whereby same comprise simple, rugged and enclosed parts and wherein adjustments are readily effected from the exterior.

Other objects and features of the invention will be set forth more fully hereinafter.

The full nature of the invention will be understood from the accompanying drawings and the following description and claims:

In the drawings, Fig. 1 is a side elevation of a control unit embodying the invention, the tire engageable end of the active element being omitted.

Fig. 2 is an end elevation of such unit.

Fig. 3 is a similar view with the spring chamber cover removed.

Fig. 4 is a similar view of the spring chamber cover.

Fig. 5 is a sectional view taken on line 5—5 of Fig. 4 and in the direction of the arrows.

Fig. 6 is a sectional view taken on line 6—6 of Fig. 2 and in the direction of the arrows.

Since the general disposition of a control unit, the electrical signals in the cab of the tractor unit or truck, etc., are fully disclosed in said patent, the present disclosure will be confined to the control unit per se.

In Figs. 1 to 4, 10 indicates a laterally directed support portion carried by the vehicle in a manner not shown herein. It is relatively stationarily mounted and of a length to support housing 11 above the inner tire of a dual tire structure, or inwardly of a single tire structure.

Rotatably supported on support 10, herein shown circular in section, is a housing cover 12, see Figs. 1, 2 and 4. It has an elongated hub 13 and a radially directed boss 14 and projecting from the latter is the arm 15 of the active or tire engageable element.

Extending inwardly from the cover 12 is a tubular boss 16 with bore 17 therein, see Fig. 6. Slidably mounted in said bore is plunger 18 having reduced stem 19 providing shoulder 20 therebetween. The outer end of the bore is reduced as at 21 and stem 19 is slidable therethrough. Between shoulder 20 and reduction 21 is interposed coil spring 22 that normally projects the plunger inwardly into the housing. The outer exposed end of stem 19 is threaded and a knurled nut 22 is mounted thereon. Same limits the degree of inward projection of plunger 18 under the influence of the spring or prevents same as desired or required.

The cover plate 12, as shown clearly in Figs. 4, 5 and 6, is peripherally grooved as at 24 so as to nest in the circular chamber 25, see Figs. 3 and 6. Projecting inwardly from the cover is cylindrical member 26 and same includes an eccentrically disposed extension 27 that is externally threaded. Cover plate 12 includes aperture 28 that receives extension 27 and the latter projects beyond the plate, see Fig. 5, and mounts adjusting nut 29 and lock nut 30. By this means the position of member 26 upon the plate may be adjusted within the limits of the eccentricity.

Within the chamber 25, and near the sidewall thereof and integral therewith and the rear wall 31, is an inwardly and radially directed abutment 32 which constitutes a bearing or retainer for one end 33 of a load spring 34 which is coiled about shaft 10. The other end of said spring is engaged with and anchored by abutment 16. The rear wall 31 also includes a pair of arcuately disposed openings 35 and 36, the former in Fig. 6 being shown as seating plunger 18. The latter opening 36 is also adapted to seat plunger 18 when the latter is registered therewith following retraction from opening or socket 35.

As shown in Fig. 1 the rear wall is extended as a boss 37 and same is directed radially inward to merge with housing hub 38. Set screws 39 through said hub secure rigidly said housing to support shaft 10. The cover 12 is retained in covering relation by collar 40 secured to support shaft 10 by set screw 41.

Reference will now be had more particularly to Fig. 3. Therein and in Fig. 1 by dotted lines is indicated a terminal chamber 42 within housing 11. Same is closed by cap or cover plate 43 having conduit inlet 44. A screw 45 therethrough secures this plate to close said chamber by threading into boss 46 in partition member 47 in said housing, said partition serving as the bottom of chamber 42.

In the housing lower chamber 25 is a resilient finger type conductor 48 having one end insulated from and carried by the partition 47 through terminal screw 49 to which one circuit line 50 is secured as shown. Also mounted upon and insulated from the partition is terminal screw 51 to which circuit line 52 is secured. Lines 50 and 52 are included in the insulated cable 53 introduced into chamber 42 at 44.

The spring contact finger 48 includes radially disposed inwardly directed portion 54, angular portion 55 and angularly disposed free end 56. When said end engages terminal 51 the circuit to the electrically operated or controlled signal indicating means of visual and/or audible type is completed. When the tire or tires are normally inflated the spring finger 55—56 is disposed as shown in Fig. 3, to wit, in open circuit position relative to terminal 51. When a tire is flat or underinflated the finger is caused to engage terminal 51 to complete the warning control circuit.

It will be obvious that the upper chamber 42 can be made and maintained leak-proof so that moisture (rain, snow or ice) cannot accumulate therein and effect shorting of lines 50 and 52. Also the operating chamber is suitably arranged for packing with light grease, etc., and the exclusion of moisture, dirt, etc. The moving or actuating member is arm 15, cover 12 and the parts supported thereby. Opposition to such movement is imposed by spring 34.

Operation

Whenever arm 15 is disposed so that plunger 18, or rather boss 16, on the cover contacts vane 32, the arm is in normal or operative position and switch member portion 56 is spaced from terminal 52 because member 26 is not then engaged with shoulder 54 of the switch finger.

When tire change is to be effected and member 15 interferes it is locked in the inoperative position by being swung upwardly (clockwise in Fig. 2) until plunger 18 seats in hole 36. At this time member 26 has passed beyond and become disengaged from the switch finger so the circuit is not held closed, see right hand indication 26 in Fig. 3.

For normal warning purposes arm 15 is swung by and incident to tire rotation (when the tire is underinflated) clockwise, see Fig. 2, from the normal position where boss 16 contacts vane 32 until plunger 18 registers with hole 35 whereupon the arm and cover is locked in a position wherein member 26 engages the switch finger to effect circuit closing. This locking in the closed circuit position insures positive continuous warning upon underinflation. Obviously member 26, if so disposed that when plunger 18 immediately approaches hole or socket 35, the circuit is not closed, the member 26 is rotatively adjusted upon the cover 12 to insure such circuit closing. Whenever plunger 18 is retracted by pulling outwardly on nut 22, the arm and cover, subject to load spring 34, are returned to normal position providing the underinflated or flat tire is removed. Adjustment and release are effected at 28—29 and 22 respectively and these are externally exposed on the cover.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a tire operable switch structure an elongated support, a housing rigid therewith and having two chambers therein opening outwardly in transverse directions, a cover for each chamber, switch terminals exposed in one chamber, switch elements exposed in the other chamber and connected to the terminals, a switch operator within said other chamber for operating at least one of the elements, and a tire operable arm external of the housing and connected to the switch operator for operation thereof, the cover of said other chamber being rotatively supported and the switch operator and tire operable arm are rigid therewith.

2. A switch structure as defined by claim 1 wherein the switch operator has an eccentric mounting upon the last mentioned cover for switch contact adjustment purposes.

3. A switch structure as defined by claim 1 wherein there is provided a constraining element normally constraining the cover to that position wherein the arm is disposed for tire engagement.

4. A switch structure as defined by claim 3 wherein there is provided a complementary interlock between the cover and housing for holding the tire operable arm in a position to facilitate tire changing.

5. A switch structure as defined by claim 3 wherein there is provided a complementary interlock between the cover and housing for holding the switch operator in the switch actuating position after the tire operable arm has been sufficiently actuated by tire engagement.

6. A switch structure as defined by claim 3 wherein there is provided a complementary interlock between the cover and housing for holding the tire operable arm in a position to facilitate tire changing, and another operator for effecting disassociation of the interlock and having an exposed manually operable portion.

7. A switch structure as defined by claim 3 wherein there is provided a complementary interlock between the cover and housing for holding the switch operator in switch actuating position after the tire operable arm has been sufficiently actuated by tire engagement, and another operator for effecting disassociation of the interlock and having an exposed manually operable portion.

8. A switch structure as defined by claim 3 wherein there is provided a complementary interlock between the cover and housing for holding the tire operable arm in a position to facilitate tire changing, said interlock comprising a cover carried pin and a recessed seat in the housing adapted to seat said pin, said housing having a second arcuately displaced seat adapted for pin seating for holding the switch operator in switch actuating position after the tire operable arm has been sufficiently actuated by tire engagement.

9. A switch structure as defined by claim 3 wherein there is provided a complementary interlock between the cover and housing for holding the tire operable arm in a position to facilitate tire changing, said interlock comprising a cover carried pin and a recessed seat in the housing adapted to seat said pin, said housing having a second arcuately displaced seat adapted for pin seating for holding the switch operator in switch actuating position after the tire operable arm has been sufficiently actuated by tire engagement, and an operator for effecting disassociation of said pin from either seat and having an exposed manually operable portion.

CLARENCE L. KITE.

REFERENCES CITED

The following references are of record in the file of this patent:

UNITED STATES PATENTS

| Number    | Name     | Date          |
|-----------|----------|---------------|
| 1,690,370 | Hoeller  | Nov. 6, 1928  |
| 2,030,671 | Williams | Feb. 11, 1936 |
| 2,112,483 | Dilts    | Mar. 29, 1938 |
| 2,213,782 | Kite     | Sept. 3, 1940 |
| 2,447,749 | Hallett  | Aug. 24, 1948 |